United States Patent [19]

Takaoka et al.

[11] 3,994,269

[45] Nov. 30, 1976

[54] MULTISTEP FLUID CONTROL VALVE

[75] Inventors: Hiroyuki Takaoka; Osamu Aki, both of Kyoto; Kazuhiro Kaneko, Tokyo, all of Japan

[73] Assignees: Mitsubishi Jidosha Kogyo Kabushiki Kaisha; Fuji Tomson Kabushiki Kaisha, both of Tokyo, Japan

[22] Filed: July 31, 1975

[21] Appl. No.: 600,806

[30] Foreign Application Priority Data

Aug. 28, 1974 Japan ................................ 49-98797
Aug. 28, 1974 Japan ................................ 49-98798

[52] U.S. Cl. ......................... 123/117 A; 123/119 A; 137/627.5; 236/92 R

[51] Int. Cl.² ...................... F02M 25/06; F02P 5/04; G05D 27/00

[58] Field of Search ................ 137/627.5; 236/92 R, 236/92 A, 92 D, 92 B, 92 C; 123/119 A, 117 A

[56] References Cited

UNITED STATES PATENTS

| | | | |
|---|---|---|---|
| 2,807,281 | 9/1957 | Allen et al. | 137/627.5 |
| 3,436,017 | 4/1969 | Elmer | 236/92 R |
| 3,455,335 | 7/1969 | Pekarek | 137/627.5 |
| 3,461,913 | 8/1969 | Scott | 137/627.5 |
| 3,478,782 | 11/1969 | Peeples | 137/627.5 |
| 3,479,096 | 11/1969 | Cruse | 137/627.5 |
| 3,680,533 | 8/1972 | Soberski | 123/117 A |
| 3,789,811 | 2/1974 | Franz et al. | 123/117 A |
| 3,800,759 | 4/1974 | Cedar | 123/117 A |
| 3,812,832 | 5/1974 | Scott | 123/119 A |

*Primary Examiner*—Wendell E. Burns
*Attorney, Agent, or Firm*—Cushman, Darby & Cushman

[57] ABSTRACT

The multistep fluid control valve comprises a valve case having a plurality of valve seats. A valve stem is provided in the valve case and is capable of being continuously or stepwise displaced axially. At least one valve body is shiftably mounted on the valve stem it is urged toward the corresponding one of the valve seats, but normally arrested at a position clear of the valve seat. This valve body closes the valve seat when the valve stem is moved a predetermined amount. At least one further valve body is provided axially in line with the valve stem so as to cooperate with a corresponding one of the valve seats. The further valve body is actuated by a further stepwise movement of the valve stem so that the corresponding valve seat is opened or closed by the further valve body.

8 Claims, 5 Drawing Figures

MULTISTEP FLUID CONTROL VALVE

FIELD OF THE INVENTION

The present invention relates to improvements in a multistep fluid control valve for use in the control for the ignition timing of an engine, the mixture ratio of the air-fuel to be supplied to the suction pipe of the engine, the rate of the exhaust gas circulation back into the suction pipe of the engine for cleaning the exhaust gas, the secondary air to be supplied to the thermal reactor provided in the exhaust gas passage or to the catalyst converter, or the autochoke system by sensing the temperature of an internal combustion engine such as used in an automobile, for example, by sensing the temperature of the engine.

BACKGROUND OF THE INVENTION

Heretofore, a multistep fluid control valve has been proposed which is operated in a plurality of control steps depending upon various temperatures of an engine when the control valve is to be opened and closed in case, for example, the control of the ignition timing and the circulation rate of the exhaust gas back into the engine is carried out by sensing the variation in the temperature of the engine. Such a multistep fluid control valve heretofore proposed utilizes a cylindrical valve case in which a valve body in the form of a piston is slidably mounted and fluid conducting openings formed in the side wall of the valve case are opened or closed by the sliding surface of the valve body when the same is moved. Such a multistep fluid control valve is very inaccurate in the opening and closing operation while the sealing characteristics is deteriorated, because the fluid conducting openings are opened or closed by the sliding surface of the valve body.

The present invention is proposed to eliminate the above described disadvantages of the prior art multistep fluid control valve.

SUMMARY OF THE INVENTION

The object of the present invention is to provide a novel and useful multistep fluid control valve which avoids the above described disadvantages of the prior art multistep fluid control valve.

The multistep fluid control valve of the present invention ia characterized by the provision of a valve stem capable of being continuously or stepwise displaced in the axial direction thereof by the actuation of an actuator, a valve body shiftably mounted on the valve stem and urged in the direction of the the valve closing direction but arrested at a predetermined position by a stopper, a valve case housing therein the valve stem and the valve body and being provided with a plurality of valve seats one of which cooperates with the valve body, the valve body being normally spaced a set distance from the one of the valve seats but being abutted thereagainst upon movement of the valve stem, at least a further valve body being provided axially of the valve stem for cooperating corresponding one of the valve seats thereby permitting the further valve body to be opened or closed by the further displacement of the valve stem stepwise with respect to the actuation of the first mentioned valve body.

Since the valve stem and the first mentioned valve body is arranged so as to be relatively shiftable, the valve bodies arranged in the multistage manner axially of the valve stem are sequentially actuated in response to the stepwise displacement of the valve stem and the blocking of the fluid passages is first effected by the abutment of the first mentioned valve body against the corresponding valve seat thereby insuring the sealing therebetween while the actuation is insured to be steady and accurate as well as superior sealing effect.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION OF THE PREFERRED EMBODIMENTS

Figure 1:
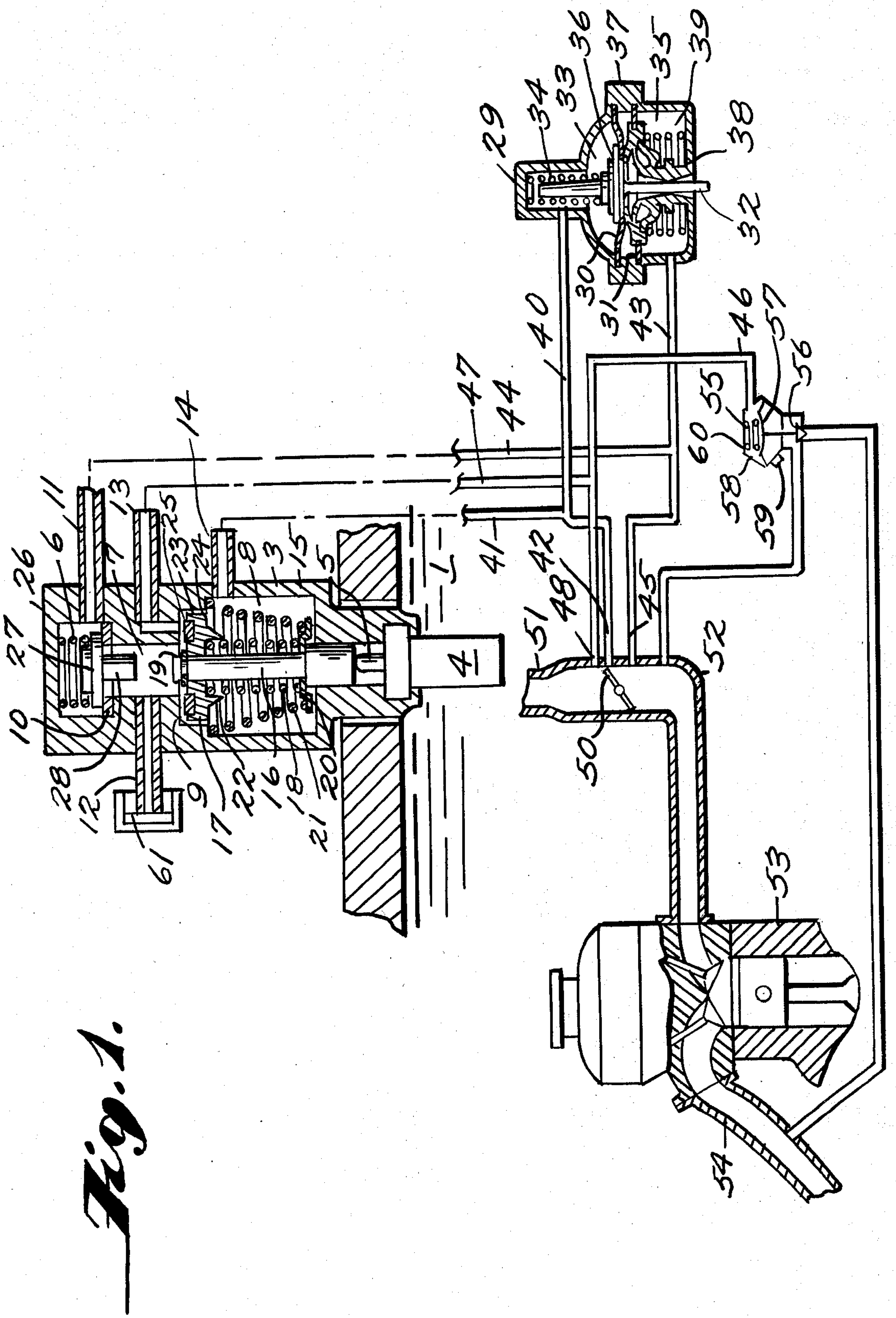
FIG. 1 is a schematic sectional view showing a first embodiment of the invention.

Referring now to FIG. 1 of the accompanying drawing, a valve case 3 is threadedly secured at the lower end thereof to the wall of the passage 2 of engine cooling water 1, and a wax element 4 is fitted in the lower portion of the valve case 3 so that it extends into the cooling water 1. The wax element 4 is provided with a shiftable bar 5 which extends upwardly in the valve case 3 and which is adapted to be moved upwardly or downwardly depending upon the expansion or contraction of the wax in the wax element 4 caused by sensing the temperature of the cooling water 1.

An upper enlarged chamber 6, a lower enlarged chamber 8 and an intermediate reduced diameter chamber 7 are formed in the valve case 3 which communicate with each other, and a valve seat 9 is provided at the shoulder formed between the intermediate chamber 7 and the lower chamber 8 while a valve seat 10 is provided at the shoulder formed between the intermediate chamber 7 and the upper chamber 6. The fluid passage 11 communicates at its one end with the upper chamber 6 and the fluid passage 12 communicates at its one end with the intermediate chamber 7 while the fluid passage 14 communicates at its one end with the lower chamber 8 and the fluid passage 13 communicates at its one end with the valve seat 9.

A valve stem 16 is upwardly and downwardly shiftably provided at the center of the valve case 3 with its lower enlarged head slidably fitted with the inner shifting peripheral surface 15 of the valve case 3. The lower end of the head of the valve stem 16 abuts against the shiftable bar 5 of the wax element 4, while an annular valve body 17 is shiftably mounted on the upper portion of the valve stem 16. The valve body 17 is urged upwardly by a spring 18 arranged around the valve stem 16 the lower end of which is supported by a spring receiving dish 20 held by a shoulder formed in the valve stem 16, and upward movement of the valve body 17 is limited by a stopper ring 19 secured to the upper end of the valve stem 16 so that the valve body 17 is normally held at a determined position relative to the valve stem 16. The lower end of a spring 21 is supported by the dish 20 and the upper end of the spring 21 is supported by a shoulder formed adjacent to the upper end of the lower chamber 8 in the valve case 3 so that the valve stem 16 is normally urged downwardly to abut against the shiftable bar 5 of the wax element 4.

A seal ring 23 is fitted in the annular groove 22 formed at the lower side of the valve body 17 so that it seals the relatively shiftable portions of the valve stem 16 and the valve body 17. The seal ring 23 is secured to the valve body 17 by a stopper ring 24. An annular groove is formed at the upper surface of the valve body 17 in which an annular elastic member 25 such as an annular rubber seat is fitted.

The valve seat 9 is so positioned that, when the valve body 17 is shifted upwardly by a distance $x$, the elastic member 25 provided in the valve body 17 abuts against the valve seat 9 so that the lower chamber 8 is shut off from the intermediate chamber 7. A valve body 27 having a downwardly extending projection 28 is upwardly and downwardly movably located in the upper chamber 6 and the valve body 27 is urged downwardly by a spring 26 interposed between the upper end of the upper chamber 6 and the upper end of the valve body 27 so that the valve body 27 is normally abutted against the valve seat 10 so as to shut off the upper chamber 6 from the intermediate chamber 7.

The downwardly extending projection 28 of the valve body 27 is so positioned that, when the valve stem 16 is moved upwardly by a distance $y$, the upper end of the valve stem 16 abuts against the lower end of the projection 28.

The wax element 4 serving as an actuator in this embodiment of the present invention is so constructed that it has expansion characteristics by which the shiftable bar 5 is displaced in two steps in the desired temperature ranges by approximately selecting and combining various kinds of waxes having different expansion characteristics. Other temperature detecting elements such as ether and alcohol and the like than the wax element 4 may be used in combination therewith. Further, a solenoid may be used as an actuator instead of the wax element 4 by which the temperature of the cooling water 1 is electrically detected so that the electromagnetic force generated by the solenoid is varied depending upon the variation in temperature of the cooling water 1 thereby permitting the valve stem 16 to be displaced in two steps by virtue of the equilibrium conditions established between the elecromagnetic force of the solenoid and the springs 18, 21 and 26.

In the embodiment shown in FIG. 1, the expansion characteristics of the wax element 4 is so selected that the wax element 4 is subjected to the first step of expansion at a temperature near 55° C so that the shiftable bar 5 is moved upwardly from the lowermost position thereof by a distance A ($x<A<y$) while it is subjected to the second step of expansion at a temperature near 95° C so that the shiftable bar 5 is moved upwardly from its lowermost position by a distance B ($y<B$).

In a multistep fluid control valve having the construction described above, when the temperature of the cooling water 1 is lower than 55° C, the valve stem 16 is located at a lower position by virtue of the action of the spring 21 as shown in FIG. 1 and, therefore, the valve body 17 is spaced from the valve seat 9 so that the lower chamber 8 communicates with the intermediate chamber 7 thereby permitting the communication between the fluid passages 12, 13 and 14. To the contrary, since the upper chamber 6 is shut off from the intermediate chamber 7 by the valve body 27, the fluid passage 11 is blocked.

As the temperature of the cooling water 1 rises in the range between 55° C and 95° C, the valve stem 16 is moved upwardly in coupled relationship with the shiftable bar 5 of the wax element 4, so that the elastic member 25 in the valve body 17 abuts against the valve seat 9 with the force of the spring 18 applied thereto, thereby permitting all the fluid passage 12, 13 and 14 to be blocked independently from each other.

When the temperature of the cooling fluid 1 rises beyond 95° C, the valve stem 16 is moved upwardly relative to the valve body 17 therethrough by the action of the shiftable bar 5, so that the upper end of the valve stem 16 abuts and urges the projection 28 of the valve body 27 upwardly thereby moving the valve body 27 upwardly against the action of the spring 26 so as to allow communication between the fluid passages 11 and 12.

Now, a description will be made in conjunction with the FIG. 1 in which the above described embodiment is applied to the control of the circulation rate of the exhaust gas or the waste gas and the device for controlling the timing of ignition.

One diaphragm 30 of the dual diaphragms 30, 31 of the vacuum phase advance control device 29 of the dual diaphragm type has a shiftable bar 32 securely fixed at the center thereof for effecting phase advance of the timing of ignition and the shiftable bar 32 is urged in the direction toward the phase retarding side negative pressure chamber 35 by means of a spring 34 provided in the phase advancing side negative pressure chamber 33, while an annular member 37 is fixedly secured to the other diaphragm 31 which contacts with the enlarged flange portion 36 of the shiftable bar 32. The annular member 37 engages with the outer annular groove in the cylindrical member 38 extending from the bottom of the phase retarding side negative pressure chamber 35 at the center thereof so as to define the amount of shifting movement of the annular member 37. The annular member 37 is urged in the direction downward the phase advancing side negative pressure chamber 33 by a spring 39 provided in the phase retarding side negative pressure chamber 35. A negative pressure leading passage 40 communicates at its one end with the phase advancing negative pressure chamber 33 and the other end of the passage 40 communicates with a suction pipe 51 adjacent to the fully closed position of the throttle valve 50 upstream thereof. The negative pressure leading passage 41 branched from the negative pressure leading passage 40 midway thereof is connected to the fluid passage 14 and an orifice 42 is provided at the opening of the passage 40 communicating with the suction pipe 51.

The negative pressure leading passage 43 opening at one end into the phase retarding negative pressure chamber 35 communicates at its other end with the suction manifold 52 of the engine 53 and the negative pressure leading passage 44 branched from the negative pressure leading passage 43 midway thereof is connected to the fluid passage 11. An orifice 45 is provided at the opening of the negative pressure leading passage 43 communicating with the suction manifold 52.

An exhaust gas circulation passage 49 is connected at its one end to the exhaust manifold 54 of the engine 53 and at its other end to the suction manifold 52 of the engine 53 and the passage 49 is provided therein with a control device 55 having a control valve 56 for opening and closing the passage 49, a diaphragm 57 connected to the valve 56, chambers 58 and 59 divided by the diaphragm 57 and a coil spring 60 provided in the chamber 58 and adapted to urge the control valve 56 in the closed position thereof. The chamber 59 opens to the atmosphere, while the chamber 58 communicates through a negative pressure leading passage 46 with the suction pipe 51 at the fully closed position of the throttle valve 50 upstream thereof. The negative pressure leading passage 47 branched from the negative pressure leading passage 46 midway thereof is connected to the fluid passage 13 and an orifice 48 is provided in the negative pressure leading passage 46 at the opening thereof into the suction pipe 51.

The fluid passage 12 opens to the atmosphere through a filter 61.

The operation and the effectiveness of the embodiment described above will be described below.

In the cold condition in which the temperature of the cooling water 1 of the engine 53 is lower than 55° C, the valve stem 16 is in the position as shown in FIG. 1, and thus, the negative pressure leading passages 41 and 47 open to the atmosphere through the passages 14, 13, the chamber 8, the chamber 7 and the passage 12 and the filter 61, while the negative pressure leading passages 40, 46 are throttled by the orifices 42, 48, so that the atmospheric pressure is applied to the phase advancing side negative pressure chamber 33 and the chamber 58. On the other hand, since the fluid passage 11 is closed by the valve body 27, the negative pressure of the suction manifold is transmitted to the negative pressure leading passage 43 through the orifice 45, while the negative pressure of the suction manifold is applied to the phase retarding negative pressure chamber 35.

Therefore, the control valve 56 closes the exhaust gas circulation passage 49 by the action of the spring 60 so that the exhaust gas can not be sucked through the suction manifold 52 thereby permitting the starting characteristics and the driving characteristic to be held superior.

Since the phase advancing negative pressure chamber 33 is held at the atmospheric pressure while the phase retarding negative pressure chamber 35 is held at the negative pressure of the suction manifold, the vacuum phase advance control device 29 of the dual diaphragm type can operate so as to displace the shiftable bar 32 depending upon the suction force of the diaphragm 31 caused by the suction manifold negative pressure by appropriately adjusting the forces of the springs 34, 39. As the result, the delay in the phase of ingition is made larger in response to the increase in the absolute valve of the suction manifold negative pressure.

As is evident from the foregoing, when the absolute valve of the suction manifold negative pressure is small immediately after the starting of the engine, i.e., when the engine is being accelerated and the driving of the engine is in a bad condition, the delay in the phase of ignition is made small so that the decrease in the output of the engine due to the delay in the ignition timing is eliminated and the deterioration of the starting characteristics and the reduction in the output at the acceleration of the engine and the like are positively avoided. Further, since the delay in the ignition timing is positively achieved sufficiently depending upon the condition of the driving of the engine, warming up of the exhaust gas cleaning device provided in the exhaust system as well as the engine can be accelerated and the idling speed immediately after the low temperature starting of the engine can be controlled to an appropriate value.

As the temperature of the cooling water 1 rises in the range between 55° C and 95° C by the warming up of the engine 53, the wax element 4 is subjected to the first step of expansion so that the shiftable bar 5 is pushed upwardly together with the valve stem 16 thereby moving the elastic member 25 of the valve body 17 in abutting relationship against the valve seat 9.

Thus, all the fluid passages 11, 12 and 14 are blocked independently from each other, so that EGR control negative pressure is introduced into the chamber 58 of the control device 55 from the suction pipe 51 through the negative pressure leading passage 46 thereby attracting the diaphragm 57 upwardly against the action of the spring 60 to open the control valve 56 while the exhaust gas is supplied to the suction manifold 52 through the exhaust gas circulation passage 49 depending upon the value of the negative pressure thereby permitting the noxious NOx in the exhaust gas to be reduced.

On the other hand, since the phase advancing side negative pressure chamber 33 is held at the distributer negative pressure supplied from the suction pipe 51 through the negative pressure leading passage 40 while the phase retarding side negative pressure chamber 35 is held at the suction manifold negative pressure, the vacuum phase advance control device 29 of the dual diaphragm type carries out the ignition timing phase advancing control by virtue of the distributer negative pressure heretofore having been effected by appropriately adjusting the force of the spring 34 acting in the direction toward the phase retarding side so that the output of the engine is improved while the phase retarding action of the distributer is effected by the suction manifold negative pressure in the idling state where the throttle valve 50 is about in fully closed state, during the range of low load or during the engine braking condition thereby permitting the exhaust cleaning device provided in the exhaust system to be held at a high temperature so as to promote the exhaust gas cleaning operation.

When the engine 53 is overheated and the temperature of the cooling water 1 rises beyond 95° C, the wax element 4 is subjected to the second step of expansion so that the valve stem 16 is further moved upwardly by the shiftable bar 5 thereby moving the valve body 27 upwardly, clearing from the valve seat 10. Thus, the upper chamber 6 communicates with the intermediate chamber 7 so that the fluid passage 11 opens to the atmosphere through the chambers 6, 7, the fluid passage 12 and the filter 61. Since the negative pressure leading passage 43 is throttled by the orifice 45, the passage 43 is subjected to the atmospheric pressure and the atmospheric pressure is applied to the phase retarding side negative pressure chamber 35.

Thus, the annular member 37 of the diaphragm 31 is urged in the phase advancing direction by the force of the spring 39, but it is arrested by the outer peripheral groove in the cylindrical member 38, so that the phase retarding action of the distributer is stopped and the overheating of the engine is prevented.

As is evident from the foregoing, in accordance with the embodiment of the present invention described above, the ignition timing phase advance control, the ignition timing phase retarding control and the control of the rate of circulation of the exhaust gas can be positively effected by means of a fluid control valve which is simple in construction and accurate in operation and such a control valve can be mounted in the engine compartment in a very small space while a reduction in cost is achieved.

In the foregoing embodiment, the multistep fluid control valve has been described as being so constructed that it is displaced in two steps wherein two fluid passages are controlled in the first step of displacement while one fluid passage is controlled in the second step of displacement. However, the present invention should not be limited to the above described construction but it may be so constructed that a plurality of valve bodies similar in construction to the valve body 17 are provided on the valve stem 16 a predetermined distance spaced from each other and the valve stem 16 can be displaced in three or more steps so that the valve bodies are successively actuated so as to control the fluid passages in each of the plurality of steps.

In case it is desired that three or more fluid passages are controlled simultaneously, a plurality of openings may be formed in the valve seat 9 or the valve seat 10 so that a plurality of fluid passages which are required to be controlled simultaneously are connected to the respective openings.

Figure 2:
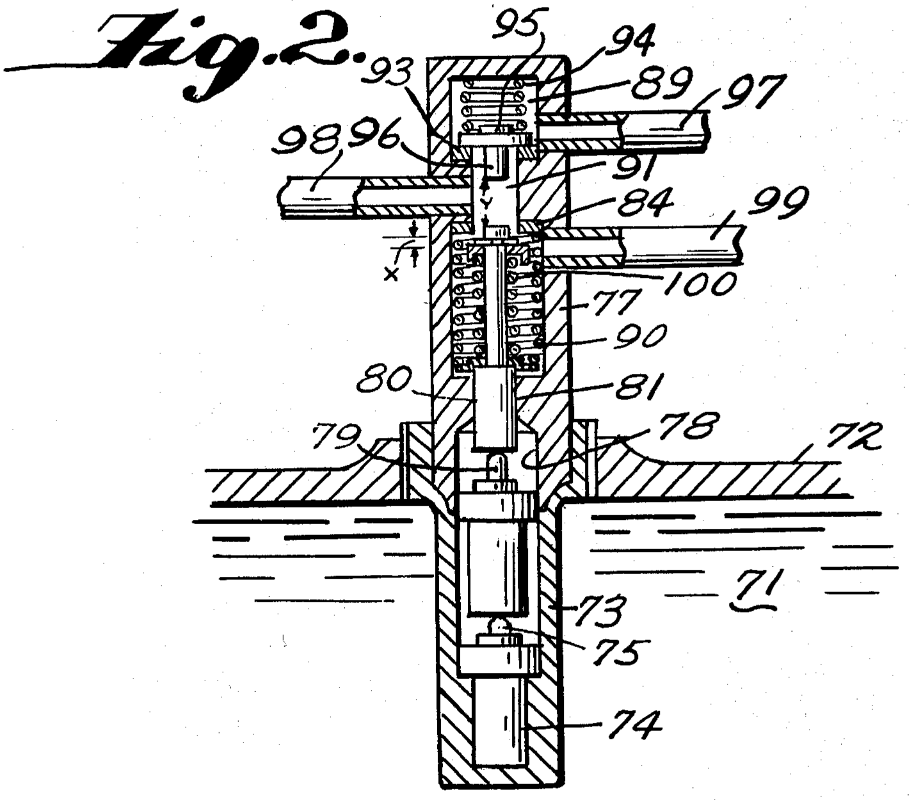
FIG. 2 is a longitudinal sectional view showing a second embodiment of the multistep fluid control valve of the present invention.

Referring now to FIG. 2–5 of the accompanying drawings in which like parts are designed by the same reference numerals, FIG. 2 shows a second embodiment of the present invention. A wax element case 73 is threadedly secured at its upper portion to the wall of the passage 72 of the engine cooling water 71 so as to be exposed to the cooling water 71 and two kinds of wax elements 74 and 76 which are adapted to quickly expand at different temperatures, respectively, are housed in series in the case 73 separately from each other. One wax element 74 is fitted in the bottom of the case 73 and it has a shiftable bar 75 shifted upwardly or downwardly by the expansion and contraction of the wax element 74. The other element 76 is slidably fitted at its upper enlarged portion in the inner peripheral surface 78 formed at the lower end of the valve case 77 and the wax element 76 is adapted to be shifted upwardly and downwardly in coupled relationship with the shiftable bar 75 of the wax element 74.

The wax element 76 has a shiftable bar 79 adapted to be shifted upwardly and downwardly in response to the expansion and contraction of the wax element 76. The tip of the shiftable bar 79 abuts against the lower end of a valve stem 80 to be described below.

The valve stem 80 is shifted by the shiftable bar 79 upwardly and downwardly with its lower enlarged portion slidably guided by the inner peripheral surface 81 of the valve case 77. A valve body 82 is shiftably mounted on the upper portion of the valve stem 80 and it is urged upwardly by a spring 83 supported at its one end on a spring receiving dish 85 supported by a shoulder formed in the valve stem 80 while the other end of the spring 83 abuts against the stopper ring 88 secured to the valve stem 80 which in turn supports a seal ring 87 provided around the valve stem 80 within an annular groove 86 formed in the valve body 82 so as to seal the relatively shiftable portions of the valve stem 80 and the valve body 82. The valve body 82 is arrested its upward movement by a stopper ring 84 secured to the valve stem 80 so that it is normally held at a predetermined position relative to the valve stem 80.

The valve case 77 is formed with an upper enlarged chamber 89, a lower enlarged chamber 90 and and intermediate reduced diameter chamber 91 communicating with each other and a valve seat 92 is provided by a shoulder between the intermediate chamber 91 and the lower chamber 90 while a valve seat 93 is provided by a shoulder between the intermediate chamber 91 and the upper chamber 89. The valve seat 92 is so positioned that the valve body 82 abuts against the valve seat 92 when the valve body 82 moves upwardly by a distance X so that the communication between the intermediate chamber 91 and the lower chamber 90 is intercepted. A valve body 95 is movably arranged in the upper chamber 89 and is urged downwardly by a spring 94 so that the valve body 95 normally abuts against the valve seat 93 so as to intercept the communication between the upper chamber 89 and the intermediate chamber 91.

The valve body 95 is formed with a downwardly extending projection 96, and the projection 96 is so positioned that, when the valve stem 80 is moved upwardly by a distance Y, the upper end of the valve stem 80 abuts against the lower end of the projection 96.

One end of the fluid passage 97 opens in the upper chamber 89 and one end of the fluid passage 98 opens in the intermediate chamber 91 while one end of the fluid passage 99 opens in the lower chamber 90.

The valve stem 80 is normally urged downwardly by a spring 100 held between the valve seat 92 and the dish 85 around the spring 83.

Figure 3:
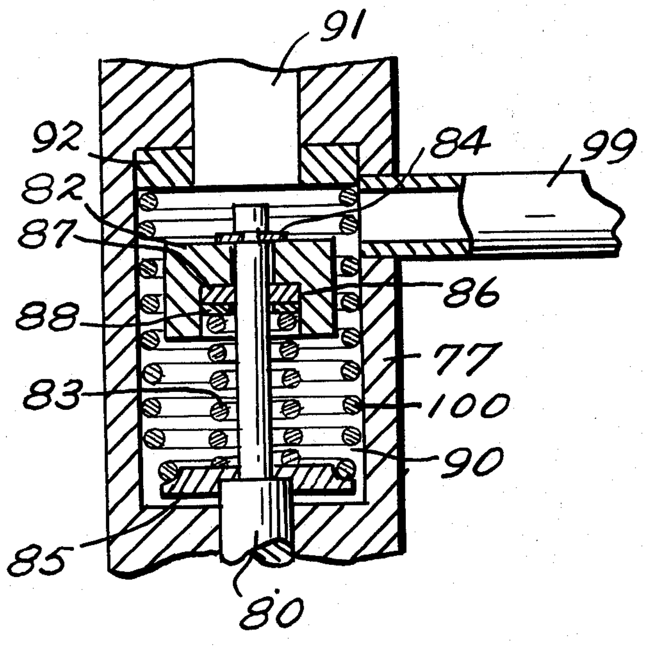
FIG. 3 is a fragmentary sectional view in enlarged scale showing the main part of the valve shown in FIG. 2.

The distances X, Y referred to above in respect to the embodiment of FIGS. 2 and 3 are appropriately set correspondingly to the amount of movement of the shiftable bar 75 and that of the shiftable bar 79, respectively. In this embodiment shown, the distances X, Y are so determined that $X<Y$.

In the second embodiment of the present invention as described above, when the temperature of the cooling water 71 is low, the valve stem 80 is in the lowermost position as shown in FIG. 2 by the action of the spring 100, so that the intermediate chamber 91 is held in communication with the lower chamber 90 thereby permitting the communication between the fluid passages 98 and 99. To the contrary, the upper chamber 89 is shut off from the intermediate chamber 91 by the valve body 95 so that the communication between the passages 97 and 98 is intercepted.

Assuming that the wax element 74 is subjected to rapid expansion at a lower temperature than that at which the wax element 76 is subjected to rapid expansion, then after driving of the engine, when the temperature of the cooling water rises beyond the temperature at which the wax element 74 is subjected to rapid expansion, the shiftable bar 75 is moved upwardly by the expansion of the wax element 74 so that the wax element 76, the valve shaft 80 and the valve body 82 are raised together in coupled relationship with the shiftable bar 75 against the action of the spring 100. When they are raised by the distance X, the valve body 82 abuts against the valve seat 92.

If the amount of the upward movement of the valve stem 80 is greater than the distance X but smaller than the distance Y, then all the fluid passages 97, 98 and 99 are held blocked from each other.

As the temperature of the cooling water 71 further rises and reaches a temperature higher than the temperature at which the wax element 76 is subjected to rapid expansion, the wax element 76 expands so that the shiftable bar 79 is moved upwardly. Thus the valve stem 80 is further moved upwardly against the action of the springs 83 and 100 with the valve body 82 being left in abutting relationship to the valve seat 92. When the valve stem 80 moves upwardly by a distance greater than the distance Y, it urges the projection 96 of the valve body 95 upwardly so that the valve body 95 is pushed upwardly against the action of the spring 94. In this position, the fluid passage 97 communicates with the fluid passage 98 while the fluid passage 99 is shut off from the fluid passage 98.

Now, a description will be made of the above described second embodiment when it is applied to the control of the rate of circulation of the exhaust gas back into the engine and of the ignition timing.

A fluid passage branched from an intermediate portion of a negative pressure leading passage of an engine for transmitting the suction pipe negative pressure to a diaphragm adapted to open and close the exhaust circulating passage (compare FIG. 1) is connected to the fluid passage 99, while a fluid passage branched from an intermediate portion of a negative pressure leading passage for transmitting the suction pipe negative pressure to the phase retarding negative control chamber of the distributer control diaphragm device adapted to control the ignition timing is connected to the fluid passage 97 and the fluid passage 98 is opened to the atmosphere. The temperature at which the wax element 74 is subjected to rapid expansion is adjusted to the temperature at which the exhaust gas circulating passage is switched from the closed position to the open position (55° C, for example) while the temperature at which the wax element 76 is subjected to rapid expansion is adjusted to the temperature at which the supply of negative pressure to the phase retarding negative pressure chamber of the control diaphragm device is stopped (95° C, for example). Then, when the temperature of the cooling water 71 is lower than 55° C, the exhaust gas will not be sucked into the suction passage thereby improving the starting characteristics and driving property at the cold state of the engine, and proper phase retardation of ignition timing is achieved in the distributer depending upon the condition of the engine and the exhaust gas cleaning operation by the cleaning device provided in the exhaust system and the warming up of the engine are promoted.

When the temperature of the cooling water 71 rises in the range between 55° and 95° C, the exhaust gas is fed back to the suction pipe of the engine thereby reducing the noxious NOx in the exhaust gas while the phase retarding action of the distributer continues so that the exhaust gas cleaning device provided in the exhaust system is kept at high temperature so as to improve the exhaust gas cleaning operation.

When the temperature of the cooling water 71 rises beyond 95° C, the phase retarding action of the distributer is stopped.

As is evident from the foregoing, in accordance with the second embodiment of the present invention, control of the fluid passages 97, 98 and 99 each of which is to be opened or shut off at different temperature, respectively, can be effected by one and the same simple valve device, thereby permitting the system to be made compact while the cost is reduced and the shut off of the fluid passages 98 and 99 is effected by the positive abutment of the valve body 82 against the valve seat 92 as well as the positive action of the spring 83 urging the valve body 82 against the valve seat 92 thereby insuring the steady and accurate operation and positive sealing action obtained by the provision of a simple seal ring 87.

In the above described second embodiment of the present invention, two kinds of wax elements 74 and 76 adapted to be rapidly expanded at different temperature from each other are utilized as an actuator for displacing the valve stem 80 in two steps. However, it is also possible to effect the similar operation to the above by one and the same wax element by varying the expansion characteristics thereof. Further, the similar operation to the above can also be achieved by utilizing an electromagnetic solenoid as the actuator by which the temperature of the cooling water is detected electrically and the electromagnetic force of the solenoid is varied depending upon the variation in the cooling water temperature so that the valve stem 80 is displaced in two steps by the equilibrium established between the electromagnetic force of the solenoid and the spring employed in the device.

Now, the third embodiment of the present invention will be described with references to FIG. 4.

In like manner as the second embodiment described above, in the third embodiment, the valve stem 80 is displaced in two steps. The difference of the third embodiment from the second embodiment lies in that only one wax element 101 is utilized in the third embodiment as an actuator and the communication between the fluid passages 97 and 98 is shut off by the second step of displacement of the valve stem 80.

The wax element 101 is so constructed that various waxes having different expansion characteristics from each other are used in combination in the wax element 101 so that it is expanded in two steps at desired temperature ranges. To this end, temperature detecting elements such as ether, alcohol and the like other than the wax element may be used in combination therewith.

Figure 4:
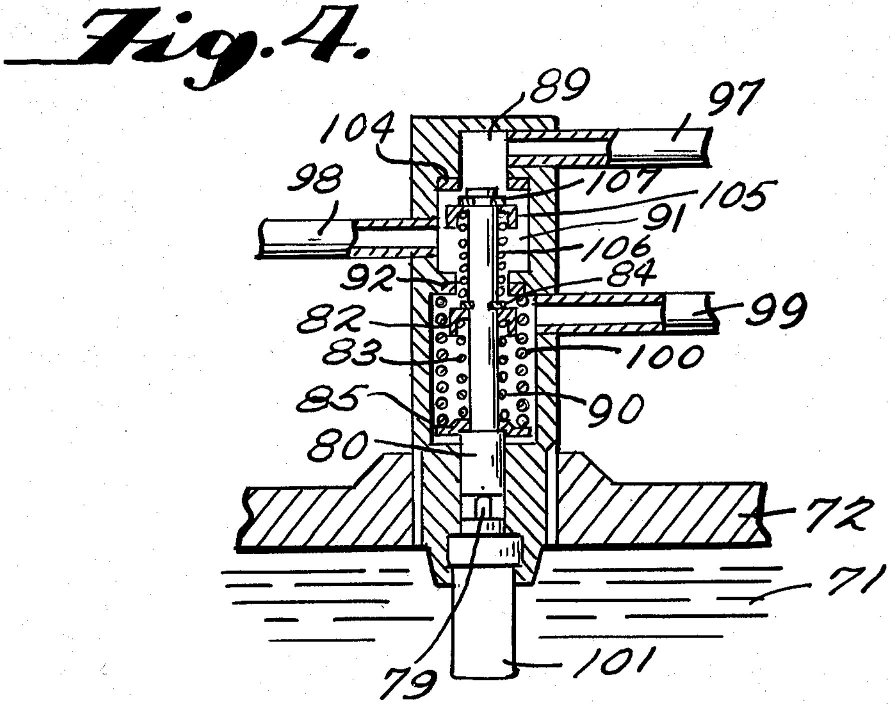
FIG. 4 is a longitudinal sectional view similar to FIG. 2 but showing a third embodiment of the present invention.

In FIG. 4, an upper reduced diameter chamber 89, an intermediate enlarged chamber 91 and a lower enlarged chamber 90 communicating with each other are formed in the valve case 77 in the above order from the upper portion to the lower portion of the valve case 77, a valve seat 92 being defined between the intermediate chamber 91 and the lower chamber 90.

A valve body 105, similar in construction and operation to the above described valve body 82, is shiftably mounted at the top of the upwardly extended portion of the valve stem 80. A valve seat 104 cooperating with the valve body 105 is provided by a shoulder between the upper chamber 89 and the intermediate chamber 91. The valve body 105 is urged upwardly by a spring 106 but arrested by a stopper ring 107 secured to the top of the upwardly extended portion of the valve stem 80 so as to normally locate the valve body 105 at a predetermined position.

In the embodiment shown in FIG. 4, the valve seat 92 and the valve seat 104 are so positioned relative to the valve body 82 and the valve body 105 respectively, that, when the valve stem 80 is moved upwardly by a distance X from its lowermost position, the valve body 82 abuts against the valve seat 92 so as to shut off the lower chamber 90 from the intermediate chamber 91 while, when the valve stem 80 is moved upwardly by a distance Y from its lowermost position, the valve body 105 abuts against the valve seat 104 so as to shut off the upper chamber 89 from the intermediate chamber 91.

Thus, in accordance with the third embodiment described above, all the fluid passages 97, 98 and 99 are held communicating with each other before the valve stem 80 moves upwardly, i.e., insofar as the valve stem 80 is held at its lowermost position. When the valve stem 80 is moved upwardly in the first step, the fluid passages 97 and 98 are held communicating each other while the fluid passage 99 is shut off from the fluid passages 97 and 98. When the valve stem 80 is further moved upwardly in the second step, all the fluid passages 97, 98 and 99 are shut off from each other.

Now, a description will be made of the third embodiment when it is applied to the control of the rate of circulation of the exhaust gas back into the suction pipe of the engine and the control of the ignition timing.

A passage branched from an intermediate portion of the negative pressure leading passage for transmitting the suction pipe negative pressure to the diaphragm device adapted to open and close the exhaust gas circulating passage (compare FIG. 1) is connected to the fluid passage 97 while a passage branched from an intermediate portion of the negative pressure leading passage for transmitting the suction system negative pressure adjacent to the fully closed position of the throttle valve to the phase advancing negative pressure chamber of the distributer control diaphragm device is connected to the fluid passage 99 and the fluid passage 98 is opened to the atmosphere. The temperature at which the wax element 101 is subjected to the first step of expansion is set to the temperature at which the supply of the negative pressure to the phase advancing negative pressure chamber of the control diaphragm device is stopped (40° C, for example) while the temperature at which the wax element 101 is subjected to the second step of expansion is set to the temperature at which the exhaust gas circulation passage is switched from the closed position to the open position (60° C, for example). Then, when the temperature of the cooling water is lower than 40° C, the exhaust gas will not be sucked into the suction passage thereby improving the starting characteristics and the driving property of the engine while the warming up of the exhaust system is promoted to improve the exhaust gas cleaning operation, because phase advancing action in the distributer is not effected.

When the temperature of the cooling water reaches a temperature between 40° C and 60° C, the phase advancing operation in the distributer is commenced so that proper phase advance of the ignition timing is achieved depending upon the output of the engine thereby increasing the output of the engine, but the exhaust gas circulation back into the suction pipe is not yet commenced.

When the temperature of the cooling water rises beyond 60° C, both the phase advancing operation in the distributer and the exhaust gas circulation back into the suction pipe are effected so that the amount of NOx in the exhaust gas is reduced.

Figure 5:
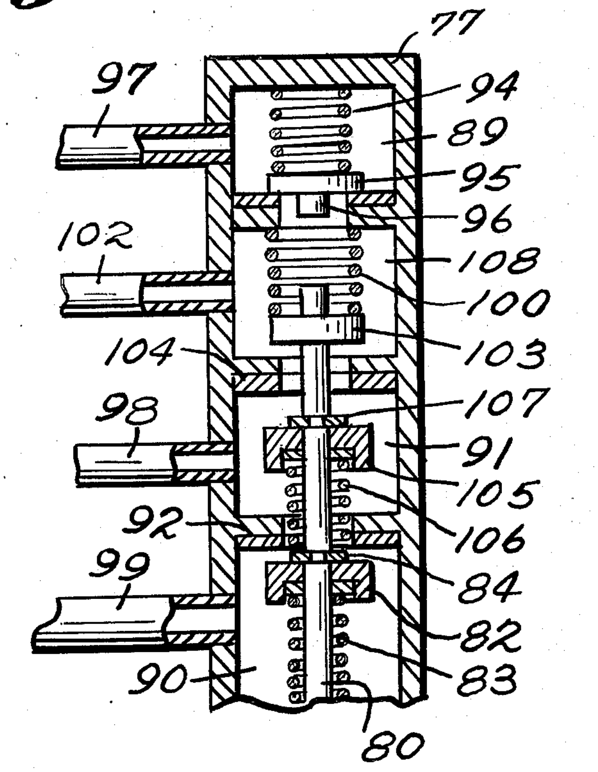
FIG. 5 is a longitudinal sectional view showing a fourth embodiment of the present invention.

Now, the fourth embodiment of the present invention will be described below with reference to FIG. 5, wherein the valve stem 80 is displaced in three steps.

The fourth embodiment is the combination of the second and the third embodiment whereby the various fluid passages are controlled in three steps.

In the fourth embodiment shown, four chambers 89, 108, 91 and 90 communicating with each other are formed in the valve case 77 in that order from the top toward the bottom thereof, valve seats 93, 104, 92 being defined between the chambers 89, 108, between the chambers 108, 91 and between the chambers 91, 90, respectively.

The chamber 89 communicates with or is shut off from the chamber 108 by means of the valve body 95 similar to that shown in FIG. 2 urged by the spring 94 downwardly, the chamber 108 being shut off or communicated with the chamber 91 by the actuation of the valve body 105 similar to that shown in FIG. 4 shiftably mounted on the valve stem 80, the chamber 91 being shut off or communicated with the chamber 90 by means of the valve body 82 similar to that shown in FIG. 4. The valve stem 80 is extended into the chamber 108 where a land 103 is formed therein against which a spring 100 abuts so as to urge the valve stem 80 downwardly. The top of the valve stem 80 is adapted to abut against the projection 96 formed at the lower side of the valve body 95 when the valve stem 80 is moved upwardly so that the valve body 95 is urged upwardly clear of the valve seat 93.

The fluid passage 97 opens into the chamber 89 and the fluid passage 102 opens into the chamber 108, while the fluid passage 98 opens into the chamber 91, the fluid passage 99 opening into the chamber 90.

In this embodiment, the locations of each of the valve seats and the projection 96 with respect to the respective cooperating valve bodies and the upper end of the valve stem 80 are so set that, when the valve stem 80 is moved upwardly from its lowermost position by a distance X, the valve body 82 abuts against the valve seat 92 so as to shut off the chamber 90 from the chamber 91 so that the fluid passage 99 is shut off, and, when the valve stem 80 further rises by a distance Y from its lowermost position, the valve body 105 abuts against the valve seat 104 so as to shut off the chamber 91 from the chamber 108 so that the fluid passage 98 is closed, while, when the valve stem 80 rises from its lowermost portion by a distance Z, the upper end of the valve stem 80 urges the projection 96 upwardly together with the valve body 95 so that the fluid passage 97 communicates with the chamber 108 through the chamber 89. The value of X, Y, Z are so determined that $X<Y<Z$.

Thus, the fluid passages 98, 99 and 102 communicate with each other while the fluid passage 97 is shut off before the valve stem 80 is displaced, i.e., when the valve stem 80 is held at its lowermost position. When the valve stem 80 is moved upwardly in the first step, i.e., by the distance X, the fluid passages 98 and 102 are held communicating with each other but the other passages are shut off. When the valve stem 80 moves in the second step, i.e., by the distance Y, all the passages are shut off each other. When the valve stem 80 moves in the third step, the passages 97 and 102 communicates each other, but other passages are shut off.

In the above description, the values of X, Y, Z are so determined that $X<Y<Z$. However, they should not be so limited, but they may be any one of the conditions of $X \gtreqless Y \gtreqless Z$ depending upon the purpose of the application. Thus, it can be used in various fluid control applications.

It should now be apparent that the (title, using lower case) as described hereinabove, possesses each of the attributes set forth in the specification under the heading "Summary of the Invention" hereinbefore. Because the (title of the invention) can be modified to some extent without departing from the principles of the invention as they have been outlined and explained in this specification, the present invention should be understood as encompassing all such modifications as are within the spirit and scope of the following claims.

What is claimed is:

1. A multi-step fluid control valve, comprising:
a valve case having means defining a plurality of valve seats therein;
a valve stem movable axially in the valve case;
an actuator operatively associated with the valve stem for axially moving the valve stem;
a first body shiftably mounted on the valve stem by means including a first means urging the first valve body toward a respective first one of said valve seats and a second means arresting the first valve body at a set position clear of the first valve seat at one position of the valve stem, whereby the first valve stem must be moved in one axial sense by said actuator from said one position in order to engage the first valve body with the first valve seat;
a further valve body shiftably mounted in the valve case in one condition of openness with respect to another of said valve seats when said valve stem is in said one position and being arranged to be moved axially from said one condition to the opposite condition of openness with respect to said other valve seat, by said valve stem, upon further movement of said valve stem in said one axial sense, than the amount required for engaging the first valve seat with the first valve body.

2. The multi-step fluid control valve of claim 1, wherein:
said one condition of openness of the further valve body is the condition of being closed, and wherein said further movement of the valve stem in said one axial sense moves said further body away from said other valve seat, to the condition of being open.

3. The multi-step fluid control valve of claim 1, wherein:
said further valve body is shiftably mounted on the valve stem by means including a first means urging the further valve body toward said other valve seat and a second means arresting the further valve body at a set position clear of said other valve seat at said one position of the valve stem and when said valve stem has been axially moved just sufficiently to cause the first valve body to engage the first valve seat;
wherein said one condition of openness of the further valve body is the condition of being open, and wherein said further movement of the valve stem in said one axial sense moves said further valve body into engagement with said other valve seat, to the condition of being closed.

4. The multi-step fluid control valve of claim 1, wherein:
the plurality of valve seats includes a third valve seat; and the valve further includes:
a third valve body shiftably mounted on the valve stem by means including a first means urging the third valve body toward the third valve seat and a second means arresting the third valve body at a set position clear of the third valve seat at said one position of the valve stem, and being arranged to be moved axially to engage the third valve seat upon axial movement of said actuator from said one position in said one axial sense by an amount differing both from that required for engaging the first valve body with the first valve seat and that required for changing the condition of openness of said further valve body with respect to said other valve seat.

5. The multi-step fluid control valve of claim 2, further including:
a first fluid passage communicating between the interior and exterior of the valve case between said first and other valve seats;
a second fluid passage communicating between the interior and exterior of the valve case axially beyond said first valve seat;
a third fluid passage communicating between the interior and exterior of the valve case at the first valve seat; and
a fourth fluid passage communicating between the interior and exterior of the valve case axially beyond said other valve seat;
whereby, engagement of the first valve body with the first valve seat isolates both the second fluid passage and the third fluid passage from communication with the first fluid passage, and wherein the fourth fluid passage remains isolated from the first fluid passage until said further movement of the valve stem has occurred.

6. The multi-step fluid control valve of claim 5, wherein:
said actuator is constructed of temperature sensitive material, responsive to a first, lower elevated temperature to move said valve stem from said one position sufficiently to engage the first valve body with the first valve seat and responsive to a second, higher elevated temperature to effect said further movement of said valve stem.

7. The multi-step fluid control valve of claim 2, wherein:
the valve stem is provided with shoulder means for operating the further valve body, said shoulder means being axially spaced from engagement with the further valve body when the valve stem is in said one position and which shoulder is brought into engagement with the further valve body upon initiation of said further movement of the valve stem.

8. The multi-step fluid control valve of claim 1, further including:
a first fluid passage communicating between the interior and exterior of the valve case between the first and other valve seats;
a second fluid passage communicating between the interior and exterior of the value case axially beyond said first valve seat; and
a third fluid passage communicating between the interior and exterior of the valve case axially beyond said other valve seat;
said actuator being constructed of temperature sensitive material, responsive to a first, lower elevated temperature to move said valve stem from said one position sufficiently to engage the first valve body with the first valve seat and responsive to a second, higher elevated temperature to effect said further movement of said valve stem;

a liquid cooled internal combustion engine having a regulable rate exhaust gas recirculation circuit switchable between two rates and having a variable degree of retardation ignition timing mechanism switchable between two different degrees of retardation;

the first fluid passage being connected to fluid pressure source means for communicating switching fluid pressure to the interior of the valve case;

the second fluid passage being connected to said regulable rate exhaust gas recirculation circuit switchable between two rates; and the third fluid passage being connected too said variable degree of retardation ignition timing mechanism switchable between two different degrees of retardation;

the actuator being disposed in heat sensing relation with the liquid coolant of said internal combustion engine, whereby sensation of the attainment of the first, lower elevated temperature results in switching of the regulable rate exhaust gas recirculation circuit between said two rates and sensation of the attainment of the second, higher elevated temperature results in switching of the variable degree of retardation ignition timing mechanism between said two different degrees of retardation.

* * * * *